(12) United States Patent
Veca et al.

(10) Patent No.: US 7,708,282 B2
(45) Date of Patent: May 4, 2010

(54) GASKET FOR THE CYLINDER HEAD OF AN ENGINE OF A MOTOR-VEHICLE, WITH A STRUCTURE OF POLYMERIC NANOCOMPOSITE MATERIAL, HAVING INTEGRATED SENSOR CAPABILITY

(75) Inventors: Antonino Veca, Casalborgone (IT); Stefano Alacqua, Rivoli Cascine Vica (IT); Alessandro Zanella, Turin (IT); Gianfranco Innocenti, Rivalta (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 390 days.

(21) Appl. No.: 11/763,919

(22) Filed: Jun. 15, 2007

(65) Prior Publication Data

US 2008/0099998 A1 May 1, 2008

(30) Foreign Application Priority Data

Oct. 26, 2006 (EP) ................................. 06425739

(51) Int. Cl.
*F02F 11/00* (2006.01)
(52) U.S. Cl. ...................................... 277/317; 277/592
(58) Field of Classification Search ......... 277/317–321, 277/590–592, 654
See application file for complete search history.

(56) References Cited

U.S. PATENT DOCUMENTS

| 4,980,516 A * | 12/1990 | Nakagawa | 174/358 |
|---|---|---|---|
| 5,121,929 A | 6/1992 | Cobb | |
| 6,945,117 B2 * | 9/2005 | Boyd et al. | 73/729.1 |
| 7,009,409 B2 * | 3/2006 | Davie et al. | 324/658 |
| 7,361,430 B1 * | 4/2008 | Gennett et al. | 429/188 |
| 2003/0042688 A1 * | 3/2003 | Davie et al. | 277/590 |
| 2004/0170367 A1 * | 9/2004 | Kenkare et al. | 385/128 |
| 2005/0110222 A1 * | 5/2005 | Matsumoto et al. | 277/592 |

OTHER PUBLICATIONS

European Search Report for EP 06 42 5739 dated Mar. 23, 2007.

* cited by examiner

*Primary Examiner*—Thomas B Will
*Assistant Examiner*—Gilbert Y Lee
(74) *Attorney, Agent, or Firm*—Heslin Rothenberg Farley & Mesiti P.C.; Victor A. Cardona, Esq.

(57) ABSTRACT

A gasket for the cylinder head of a motor-vehicle engine includes a body including a polymeric matrix containing a reinforcement material including a dispersion of nanofibers or nanotubes of electrically conductive material. Each nanotube or nanofiber has a substantially elongated shape. A uniform distribution of electrodes is associated to the body. Two layers of electrically insulating material are arranged on the top and bottom surfaces of the body, one on top of and one underneath the polymeric matrix, and designed to insulate electrically the dispersion of nanofibers or nanotubes contained therein. Control and processing means are designed to be connected to any pair of electrodes of the distribution for determining any variation of load applied in an axial direction to the gasket.

13 Claims, 9 Drawing Sheets

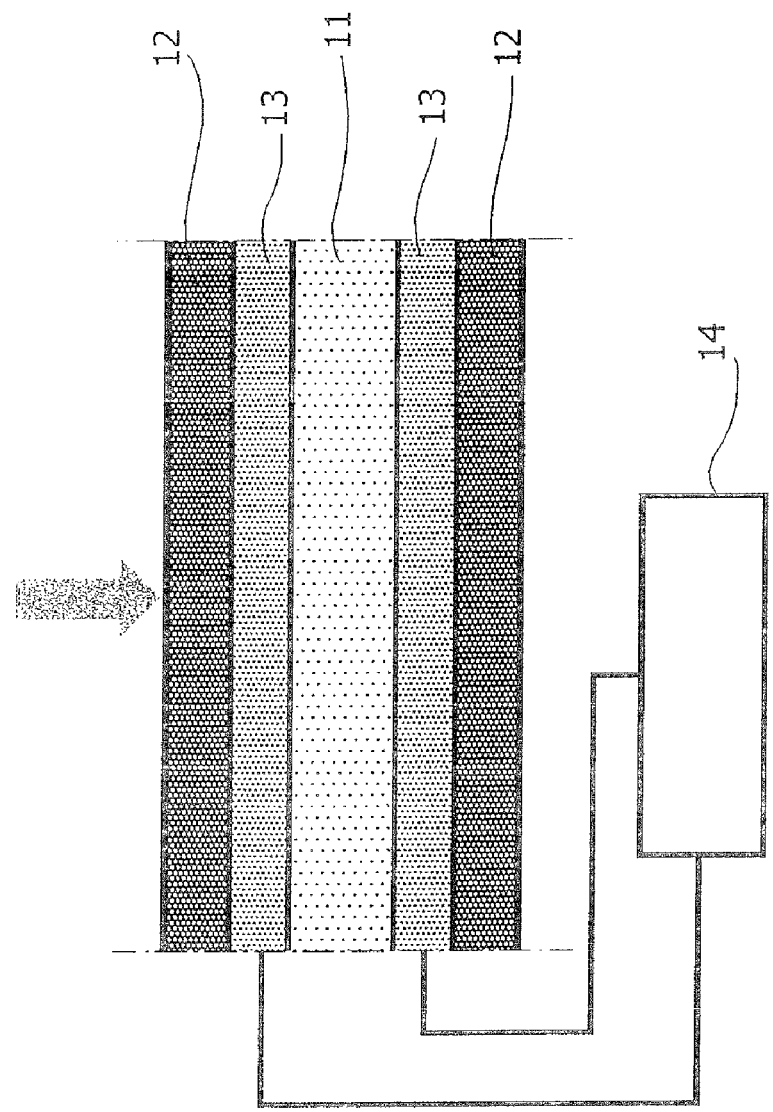

GASKET FOR THE CYLINDER HEAD OF AN ENGINE OF A MOTOR-VEHICLE, WITH A STRUCTURE OF POLYMERIC NANOCOMPOSITE MATERIAL, HAVING INTEGRATED SENSOR CAPABILITY

CROSS REFERENCE TO RELATED APPLICATIONS

This application claims priority from European Patent Application No. 06425739.7 filed on Oct. 26, 2006, the entire disclosure of which is incorporated herein by reference.

BACKGROUND OF THE INVENTION

The present invention relates to the field of structures made of polymeric nanocomposite material with a base of carbon nanotubes or nanofibres or other electrically conductive material.

By the term "polymeric nanocomposite with a base of carbon nanotubes or nanofibres or other electrically conductive material" is meant a material formed by a polymeric matrix and by a filler constituted by carbon nanotubes or nanofibres or electrically conductive material.

The piezoresistive characteristics of composites with a base of carbon nanotubes or nanofibres or of other electrically conductive material have already been exploited for providing sensors, for example deformation sensors, designed to be positioned in desired points of a structure to be monitored.

SUMMARY OF THE INVENTION

The purpose of the present invention is to exploit the structural and functional characteristics of the materials described above for providing a gasket for the cylinder head of a motor-vehicle engine.

According to the main aspect of the invention, the purpose is consequently to provide a gasket for the cylinder head of a motor-vehicle engine, comprising:

a body, including a polymeric matrix containing a reinforcement material constituted by a dispersion of nanofibres or nanotubes of electrically conductive material, in which each nanotube or nanofibre has a substantially elongated conformation;

a uniform distribution of electrodes associated to said body;

two layers of electrically insulating material, arranged on the top and bottom surfaces of said body, one on top of and one underneath said polymeric matrix, and designed to electrically insulate said dispersion of nanofibres or nanotubes contained therein; and control and processing means, designed to be connected to any pair of electrodes of said distribution, for detecting any variation of electrical resistance across said electrodes and consequently determining any corresponding variation of load applied in the axial direction to the gasket, in such a way that the gasket functions as integrated load sensor.

Preferably, the body of the gasket has a substantially annular conformation, and starting from the circumferential surface of said body appendages made of polymeric material extend radially outwards.

In a first embodiment, the distribution of electrodes is arranged on the appendages outside the area subjected to the axial load, and said electrodes are substantially co-planar with respect to one another. In said first embodiment, the body of the gasket has, in a portion thereof corresponding to two electrodes set alongside one another, an interruption in the layer formed by the polymeric matrix, in which the interruption is filled with insulating material.

In a second embodiment, the distribution of electrodes is arranged on the top surface and on the bottom surface of the body of the gasket, on two planes substantially parallel to one another, between the layers of electrically insulating material and the polymeric matrix, forming a multilayer gasket.

Preferably, the distribution of electrodes is such that the pair of electrodes to be connected to the control and processing means can be selected in such a way as to measure the load that acts on the entire gasket or on a single sector of the gasket. In addition, the layers of electrically insulating material are not compressible and transfer completely the load applied to the polymeric matrix. Advantageously, the electrodes can be made also with techniques of "sputtering" or thermal evaporation on the body of the gasket or with any other technique capable of depositing metal thin films.

The gasket according to the present invention enables point detection of the load to which it is subjected in the step of tightening of the cylinder head on the engine block, in this way enabling a tightening with uniformly distributed load to be carried out. In addition, the gasket according to the present invention is able to afford diagnostic functions by verifying that the tightening load that guarantees the seal does not drop below thresholds of criticality, guaranteeing a continuous monitoring throughout the engine operating cycle.

Finally, in a currently preferred embodiment, the nanotubes and nanofibres have a conformation with a length-to-diameter ratio higher than 10.

BRIEF DESCRIPTION OF THE DRAWINGS

Further characteristics and advantages of the invention will emerge from the ensuing description with reference to the annexed plate of drawings, which are provided purely by way of non-limiting example and in which:

FIG. 10 is a cross-sectional view of a portion of the gasket of FIG. 9;

DETAILED DESCRIPTION OF THE INVENTION

Figure 1:
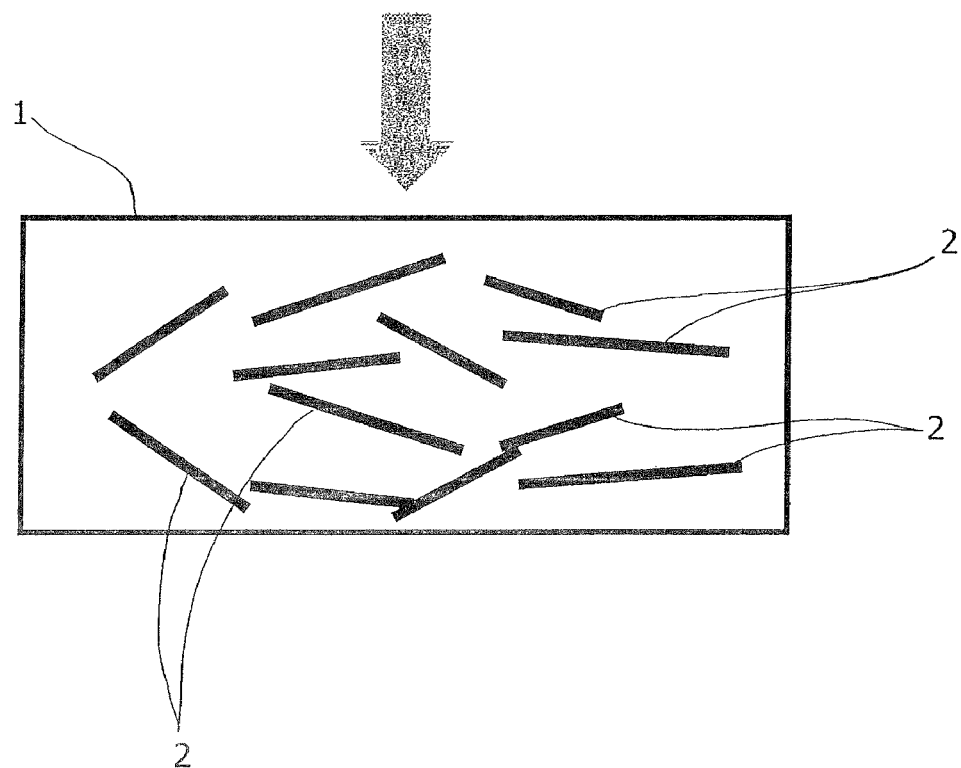
FIGS. 1 and 2 illustrate the piezoresistive properties of nanocomposite materials obtained by integrating nanotubes or nanofibres within the polymeric matrix.
Figure 2:

In FIGS. 1 and 2 a polymeric matrix is designated as a whole by the reference number 1. The polymeric matrix 1 contains a reinforcement material 2 constituted by a dispersion of nanofibres or nanotubes of electrically conductive material. In the absence of external stresses (see FIG. 1), the nanofibres or nanotubes of electrically conductive material have a substantially random arrangement within the polymeric matrix 1.

By applying a force F (or load) on the top surface of the polymeric matrix 1, a compression of the polymeric matrix with consequent alignment of the nanofibres or nanotubes 2 is obtained (see FIG. 2). The alignment of the nanofibres or nanotubes 2 generates a variation in the electrical resistivity of the nanocomposite material.

The electrical resistivity, also referred to as specific electrical resistance, is the capacity of a material for opposing resistance to the passage of electricity. The resistivity p, the measurement unit of which in the international system is ohms per meter, is given by:

$$\rho = \frac{RS}{l}$$

where:

R is the electrical resistance of a specific specimen of material measured in ohms;

l is the length in meters; and

S is the area of the cross section of the specimen in square meters.

The nanotubes and nanofibres 2 can be made of carbon, metal, or metal alloys.

Examples of materials advantageously used for the synthesis of nanofibres or nanotubes are, for example, copper, silver, platinum, carbon, and nickel-titanium alloys.

Integration of said materials in polymeric or composite matrices generates new nanocomposite materials provided with piezoresistive properties.

In order for the piezoresistive properties to emerge, the fibres will have to be electrically conductive and their length-to-diameter ratio will have to be preferably higher than 10 so as to enable a significant effect of variation of electrical resistivity as a function of their alignment.

Figure 3:
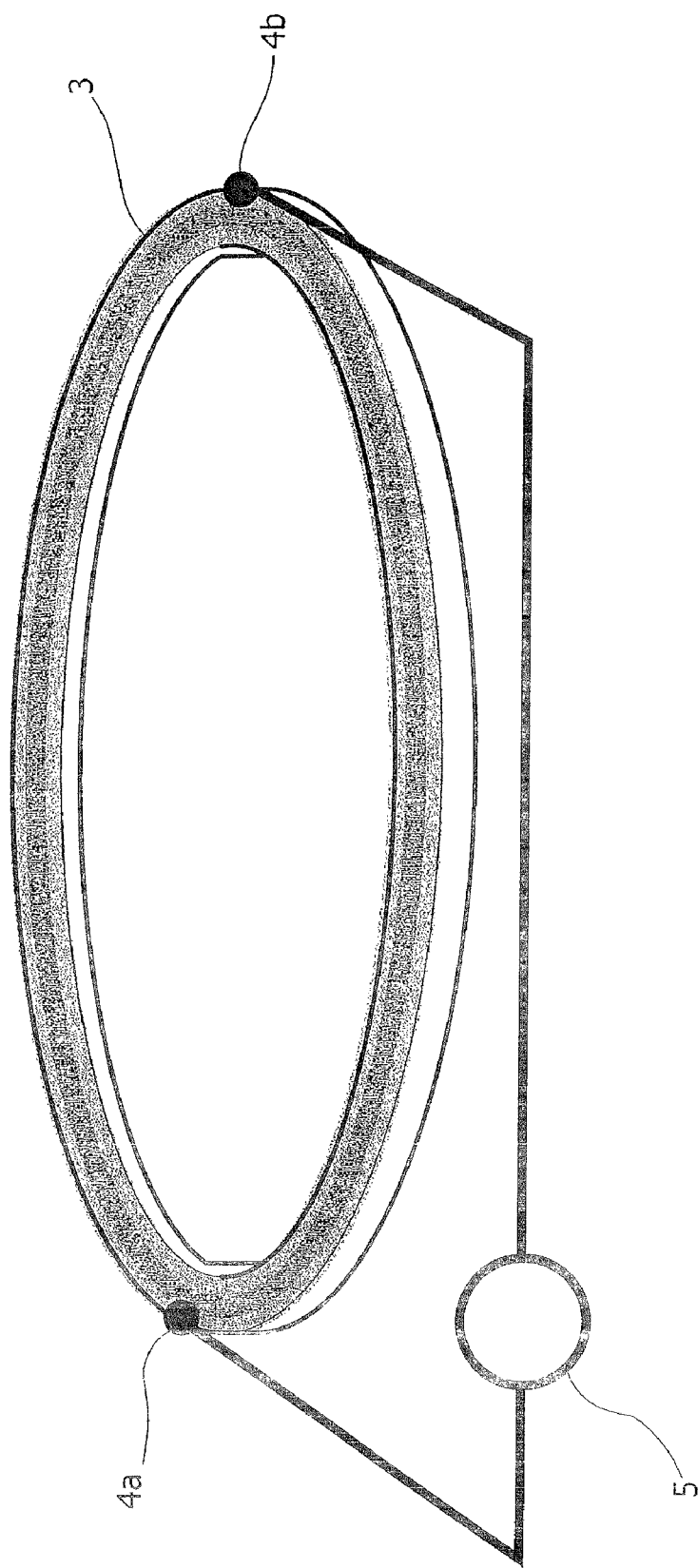
FIG. 3 is a perspective view of a gasket made of nanocomposite material with piezoresistive properties.

With reference to FIG. 3, a gasket made of polymeric nanocomposite material is designated as a whole by the reference number 3. The arrows indicate the direction of application of a load in the axial direction of the gasket.

It is possible to measure the resistivity or electrical resistance of the gasket 3 by connecting the electrodes of an ohmmeter 5 between the points 4a and 4b of gasket 3. On the basis of reading of the electrical resistance, it is possible to calculate the load acting on the gasket in the axial direction.

Figure 4:
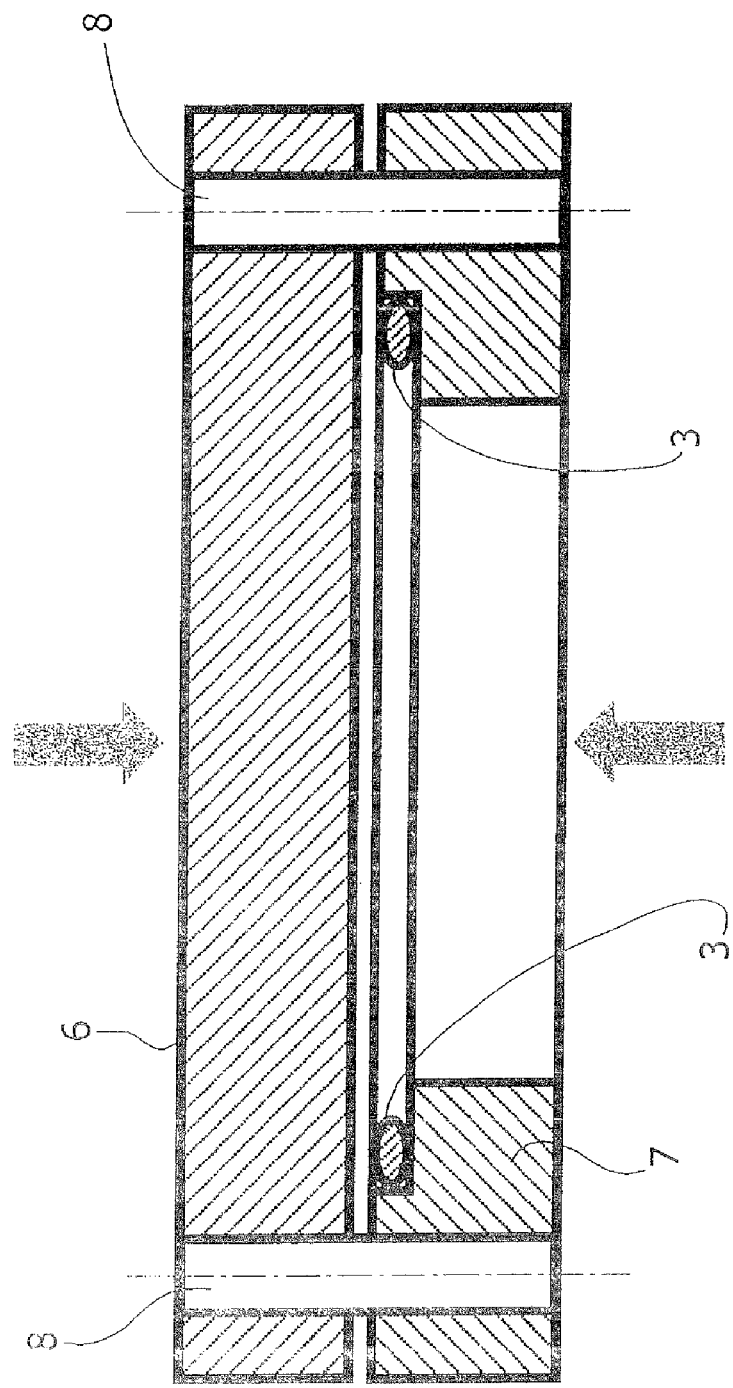
FIG. 4 is a cross-sectional view of the coupling of a cylinder head to an engine block in a motor-vehicle engine, set between which is a gasket according to the present invention.

FIG. 4 is a cross-sectional view of a cylinder head 6 set on top of an engine block 7 of a motor-vehicle, set between which is a gasket 3 made of nanocomposite polymeric. The engine block 7 and the cylinder head 6 are fixed to one another by means of tightening screws 8.

Figure 5:
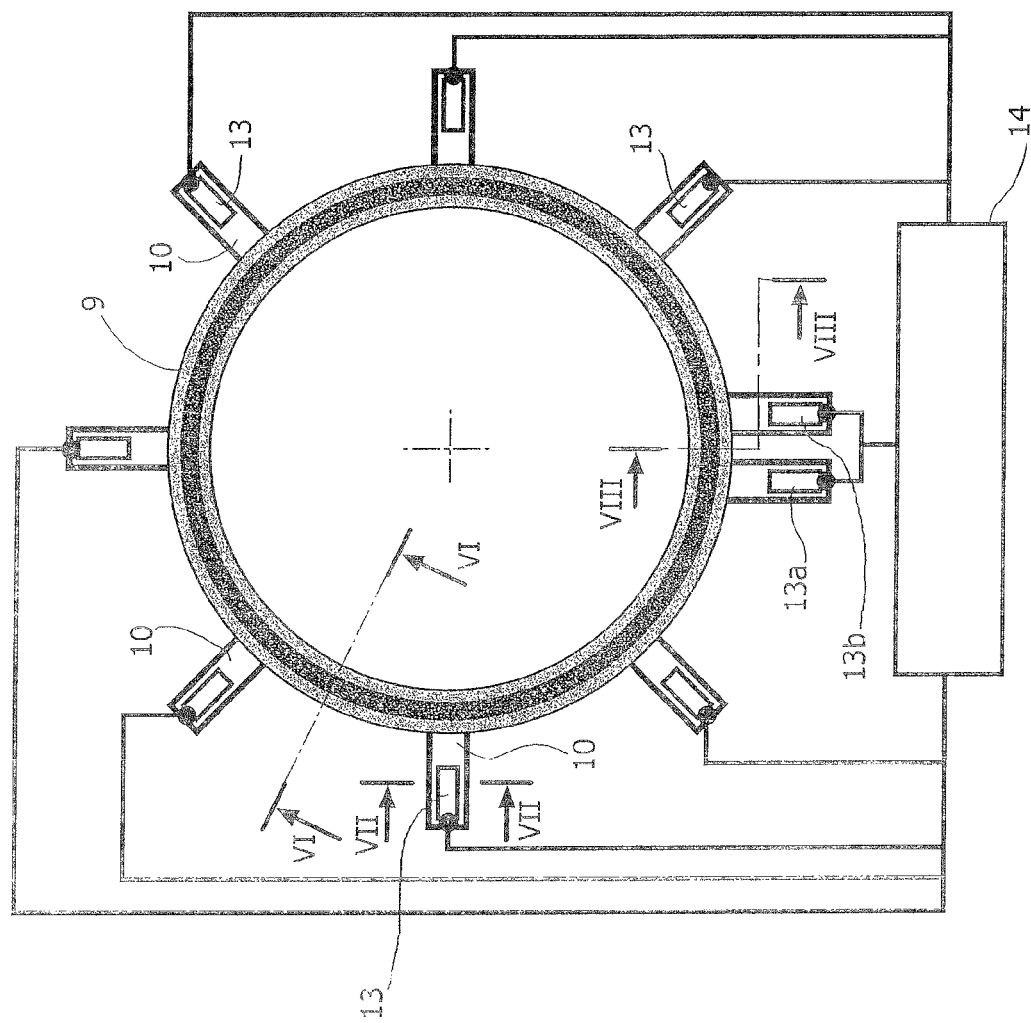
FIG. 5 is a top plan view of a first embodiment of the gasket according to the present invention.

With reference to FIG. 5, number 9 designates the body of a gasket 3. The body 9, which has a substantially annular shape, is made with a polymeric matrix containing a reinforcement material constituted by a dispersion of nanofibres or nanotubes made of electrically conductive material, in which each nanotube or nanofibre has a substantially elongated conformation. Starting from the circumferential surface of the body 9 appendages 10 made of the same polymeric nanocomposite material that forms the body 9 of the gasket extend radially outwards.

The body of the gasket 9 is coated, on its top and bottom surfaces, with two layers 12 of electrically insulating material.

The two layers 12 of electrically insulating material are arranged one on top of and one underneath the layer 11 formed by the polymeric nanocomposite material and are designed to insulate electrically the dispersion of nanofibres or nanotubes contained therein.

Figure 6:
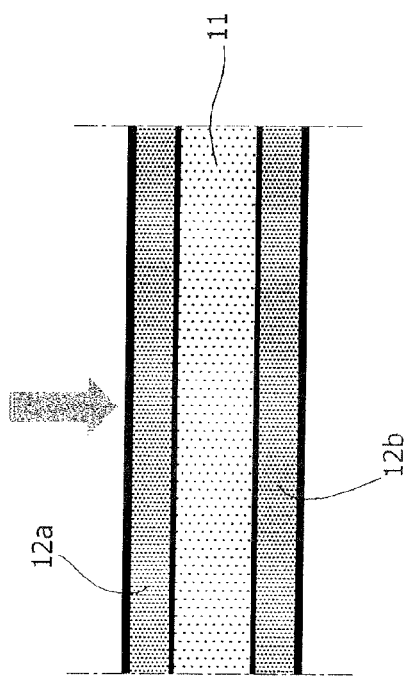

With particular reference to FIG. 6, the body 9 of the gasket 3 assumes a multilayer appearance, in which the layer 11 of polymeric nanocomposite material (formed by the polymeric matrix containing the reinforcement material constituted by the dispersion of nanofibres or nanotubes) is insulated by means of a top layer 12a and a bottom layer 12b of electrically insulating material 12.

Associated to the body 9 of the gasket is a plurality of electrodes 13. In the embodiment illustrated in FIG. 5, the electrodes 13 are arranged on the appendages 10 on the outside with respect to the annular portion of the body 9 subjected to the axial load. In said embodiment, the electrodes 13 are substantially co-planar to one another.

Figure 7:
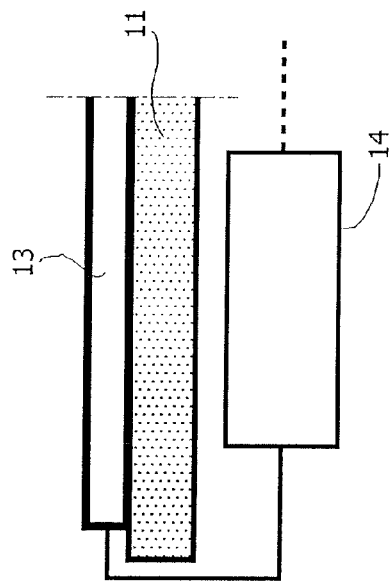
FIGS. 6-8 are cross-sectional views of portions of the gasket of FIG. 5.

The cross section of FIG. 7 illustrates a portion of appendage 10 comprising the layer 11 of polymeric nanocomposite material, deposited on which is an electrode layer 13.

Designated by the reference 14 in FIGS. 5 and 7 are the control and processing means designed to be connected to any pair of electrodes 13 for detecting any variation of electrical resistance across the aforesaid electrodes and consequently determining any corresponding variation of load applied in the axial direction to the body 9 of the gasket 3. In this case, the gasket functions as integrated load sensor.

In the embodiment of FIG. 5, the electrodes 13 on the appendages 10 made of polymeric material are not coated with the layers of electrically insulating material 12.

Figure 8:
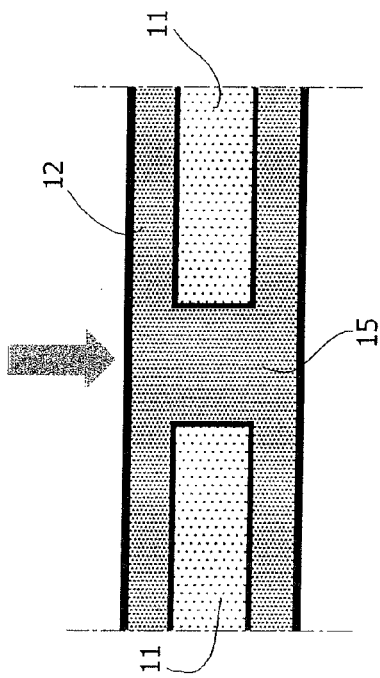

As is illustrated in FIG. 8, the body 9 of the gasket 3 has, in a portion thereof corresponding to two electrodes 13a and 13b set alongside one another, an interruption 15 in the layer formed by the polymeric matrix 11, in which said interruption 15 is filled with the material that constitutes the insulating layers 12.

Figure 9:
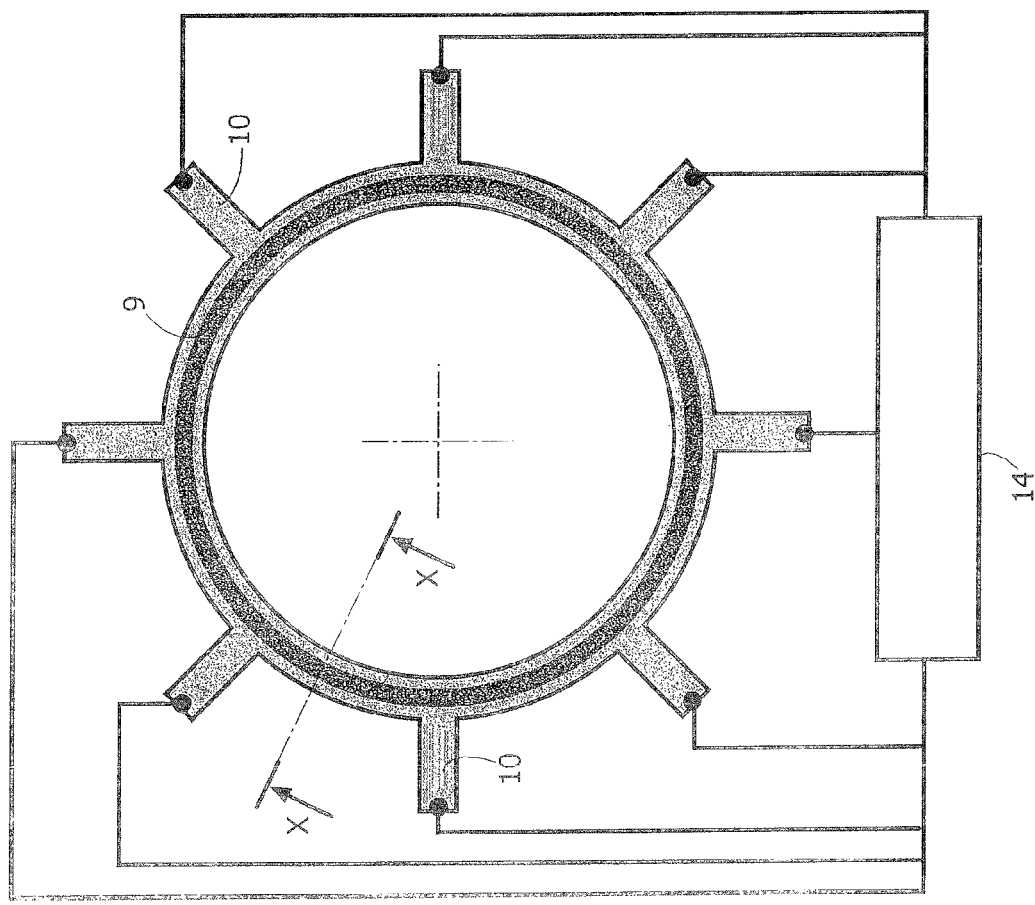
FIG. 9 is a second embodiment of the gasket according to the present invention.

With reference to the second embodiment illustrated in FIG. 9, both the body 9 of the gasket and its appendages 10 are coated with the layers of electrically insulating material 12. In this embodiment, the electrodes are arranged on the top surface and on the bottom surface of the body 9 of the gasket, on two surfaces substantially parallel to one another, between the layers of electrically insulating material 12 and the polymeric material 11 forming a multilayer gasket.

With reference to FIG. 10, the polymeric material 11 is englobed in sandwich fashion between two electrode layers 13 and two layers of electrically insulating material 12.

Figure 12:
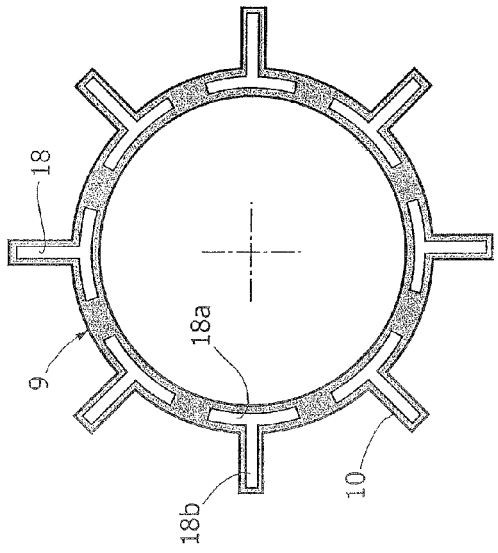
FIGS. 11-13 illustrate variant embodiments of the electrodes of FIG. 9.
Figure 13:
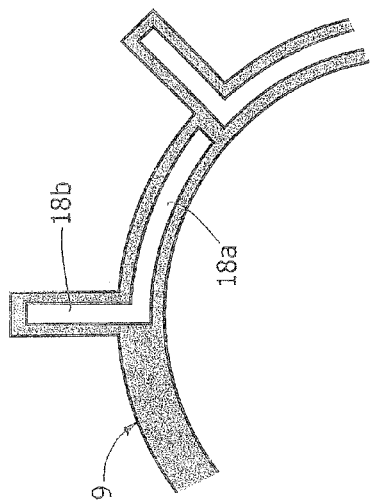
Figure 11:
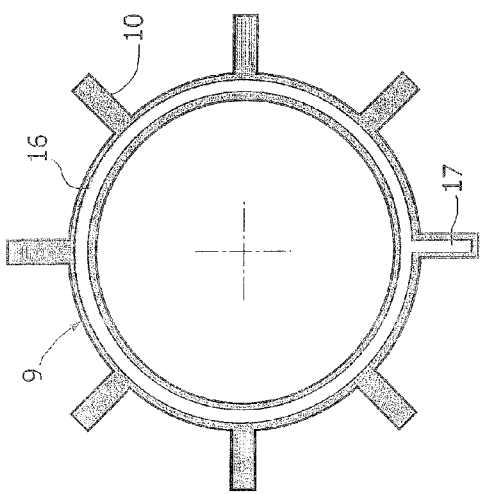

FIGS. 11-13 illustrate different conformations of the electrode layers 13.

In particular, in FIG. 11 the electrode layer has an annular conformation 16, substantially corresponding to the conformation of the body 9 of the gasket, starting from which there extends, radially outwards, just one appendage 17.

The electrode layer 16, 17 is made on the polymeric material 11 of the body 9 of the gasket in such a way that the appendage 17 is made in a position corresponding to an appendage 10 of the body of the gasket 9.

In the gasket of FIG. 9, one or both of the electrode layers 13 can assume the conformation illustrated in FIG. 11.

Instead, with reference to FIGS. 12 and 13, the electrode layer 13 has a segmented conformation 18, in which each segment comprises a first stretch 18a, shaped in a way corresponding to a portion of the body 9 of the gasket, starting from which there extends radially outwards a second stretch 18b defining an appendage designed to be set on an appendage 10 of the body of the gasket.

In the example of FIG. 12, the second stretch 18b extends from the central portion of the first stretch 18a of the electrode segment 18. FIG. 13 illustrates, instead, a variant in which the second stretch 18b extends from end portions of the first stretch 18a.

The electrodes are arranged, in both of the embodiments of FIG. 5 and FIG. 9, in such a way that the pair of electrodes to be connected to the control and processing means 14 can be selected in such a way as to measure the load that acts on the entire gasket or on a single gasket sector.

The layers of electrically insulating material 12 are not compressible and transfer completely the applied load to the polymeric matrix.

Advantageously, the electrodes are obtained by moulding with sputtering or thermal-evaporation techniques on the body of the gasket and/or on the body of the appendages.

The nanotubes and nanofibres present as reinforcement material within the polymeric matrix have a conformation with a length-to-diameter ratio higher than 10.

Figure 14:
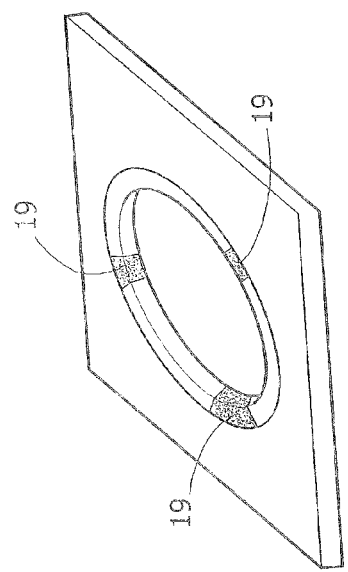
FIG. 14 is a schematic perspective view of a partially sensorized gasket.

With reference to FIG. 14, just some portions 19 of the body 9 of the gasket comprise the polymeric matrix, in this way providing a plurality of integrated load sensors.

Figure 15:
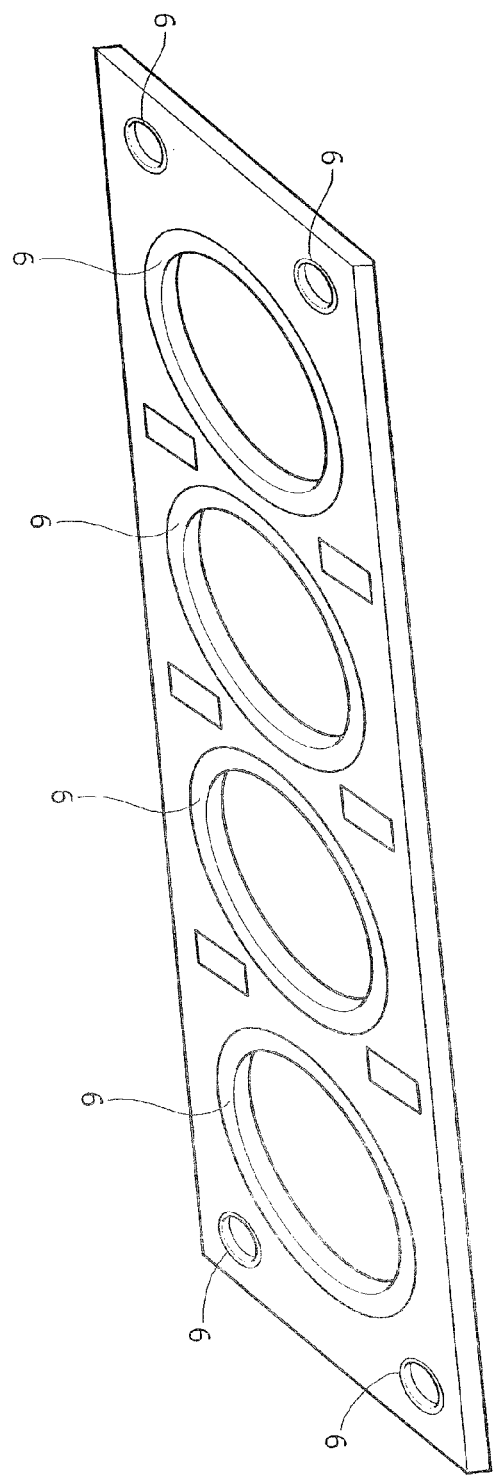
FIG. 15 illustrates an example of application of the gaskets according to the present invention.

FIG. 15 illustrates an example of application of the gaskets according to the present invention.

Of course, without prejudice to the principle of the invention, the details of construction and the embodiments may vary widely with respect to what is described and illustrated herein purely by way of example, without thereby departing from the present invention.

What is claimed is:

1. A gasket system for the cylinder head of a motor-vehicle engine, comprising:
    a gasket comprising:
        a body, including a polymeric matrix comprising a reinforcement material comprising a dispersion of nanofibres or nanotubes of electrically conductive material, wherein each nanotube or nanofibre has a substantially elongated shape, said body having a substantially annular shape;
        a uniform distribution of electrodes connected to said body and coupled to said electrically conductive material;
        two layers of electrically insulating material, arranged on the top and bottom surfaces of said body, one on top of and one underneath said polymeric matrix, and configured to insulate electrically said dispersion of nanofibres or nanotubes contained therein; and
        control and processing means configured to be connected to any pair of said electrodes of said distribution for detecting any variation of electrical resistance across said electrodes and determining any corresponding variation of load applied in the axial direction to the gasket, in such a way that the gasket functions as an integrated load sensor;
    wherein appendages made of polymeric material extend radially outwards from the circumferential surface of said body, said appendages not coated with the layers of electrically insulating material; and
    said electrodes arranged on said appendages on the outside with respect to the area subjected to the axial load, said electrodes substantially co-planar to one another.

2. The gasket system according to claim 1, wherein the body of the gasket has, in a portion thereof corresponding to two electrodes set alongside one another, an interruption in the layer formed by the polymeric matrix, in which said interruption is filled with insulating material.

3. The gasket system according to claim 1, wherein said distribution of electrodes is arranged on the top surface and on the bottom surface of said body, on two surfaces substantially parallel to one another, between said layers of electrically insulating material and said polymeric matrix, forming a multilayer gasket.

4. The gasket system according to claim 3, wherein at least one of said electrode layers has an annular shape, substantially corresponding to the shape of the body of the gasket, starting from which there extends radially outwards just one appendage set on one of said appendages made of polymeric material.

5. The gasket system according to claim 3, wherein at least one of said electrode layers has a segmented shape in which each segment comprises a first stretch, shaped in a way corresponding to a portion of the body of the gasket, starting from which there extends radially outwards a second stretch defining an appendage set on one of said appendages made of polymeric material.

6. The gasket system according to claim 5, wherein said second stretch extends from the central portion of said first stretch.

7. The gasket system according to claim 3, wherein said appendages made of polymeric material are also coated with the layers of electrically insulating material.

8. The gasket system according to claim 1, wherein said distribution of electrodes is arranged such that the pair of electrodes to be connected to the control and processing means can be selected in such a way as to measure the load that acts on the entire gasket or on a single gasket sector.

9. The gasket system according to claim 1, wherein said layers of electrically insulating material are not compressible such that said layers transfer completely the load applied to the polymeric matrix.

10. The gasket system according to claim 1, wherein said electrodes are obtained by moulding with sputtering or thermal-evaporation techniques or any other technique capable of depositing metal thin films on the body of the gasket.

11. The gasket system according to claim 1, wherein said nanotubes and nanofibres have a shape with a length-to-diameter ratio higher than 10.

12. The gasket system according to claim 1, wherein a plurality of portions of said body of the gasket comprise said polymeric matrix, said plurality of portions comprising a plurality of integrated load sensors.

13. A gasket system for the cylinder head of a motor-vehicle engine, comprising:
    a gasket comprising:
        a body, including a polymeric matrix comprising a reinforcement material comprising a dispersion of nanofibres or nanotubes of electrically conductive material, wherein each nanotube or nanofibre has a substantially elongated shape, said body having a substantially annular shape;
        a uniform distribution of electrodes connected to said body and coupled to said electrically conductive material;
        two layers of electrically insulating material, arranged on the top and bottom surfaces of said body, one on top of and one underneath said polymeric matrix, and configured to insulate electrically said dispersion of nanofibres or nanotubes contained therein; and
        control and processing means configured to be connected to any pair of said electrodes of said distribution for detecting any variation of electrical resistance across said electrodes and determining any corresponding variation of load applied in the axial direction to the gasket, in such a way that the gasket functions as an integrated load sensor;

wherein appendages made of polymeric material extend radially outwards from the circumferential surface of said body; and wherein said distribution of electrodes is arranged on the top surface and on the bottom surface of said body, on two surfaces substantially parallel to one another, between said layers of electrically insulating material and said polymeric matrix, forming a multilayer gasket.

\* \* \* \* \*